United States Patent
Shi et al.

(10) Patent No.: US 11,963,049 B2
(45) Date of Patent: Apr. 16, 2024

(54) INFORMATION PROCESSING AND RECEIVING METHOD AND DEVICE, AND STORAGE MEDIUM

(71) Applicant: ZTE Corporation, Shenzhen (CN)

(72) Inventors: Xiaojuan Shi, Shenzhen (CN); He Huang, Shenzhen (CN); Nan Zhang, Shenzhen (CN); Jianwu Dou, Shenzhen (CN)

(73) Assignee: ZTE CORPORATION, Shenzen (CN)

( * ) Notice: Subject to any disclaimer, the term of this patent is extended or adjusted under 35 U.S.C. 154(b) by 220 days.

(21) Appl. No.: 17/311,404

(22) PCT Filed: Nov. 26, 2019

(86) PCT No.: PCT/CN2019/120944
§ 371 (c)(1),
(2) Date: Jun. 7, 2021

(87) PCT Pub. No.: WO2020/114276
PCT Pub. Date: Jun. 11, 2020

(65) Prior Publication Data
US 2022/0030478 A1    Jan. 27, 2022

(30) Foreign Application Priority Data
Dec. 7, 2018 (CN) .......................... 201811497080.0

(51) Int. Cl.
*H04W 36/00*   (2009.01)
*H04B 7/185*   (2006.01)
*H04W 68/00*   (2009.01)

(52) U.S. Cl.
CPC .... *H04W 36/0061* (2013.01); *H04B 7/18543* (2013.01); *H04W 68/00* (2013.01)

(58) Field of Classification Search
CPC . H04W 36/0061; H04W 68/00; H04W 72/23; H04W 16/02; H04W 48/12;
(Continued)

(56) References Cited

U.S. PATENT DOCUMENTS

2017/0230104 A1   8/2017   Purkayastha
2017/0331577 A1   11/2017  Parkvall

FOREIGN PATENT DOCUMENTS

CN   102136863 A   7/2011
CN   103916902 A   7/2014
(Continued)

OTHER PUBLICATIONS

International Search Report for corresponding application PCT/CN2019/120944 filed Nov. 26, 2019; dated Jan. 18, 2020.
(Continued)

*Primary Examiner* — Marisol Figueroa
(74) *Attorney, Agent, or Firm* — CANTOR COLBURN LLP

(57) ABSTRACT

An information processing method provided in the present disclosure includes: allocating, to a Non-Terrestrial Network (NTN) cell, at least one of a frequency band dedicated to the NTN cell, a frequency dedicated to the NTN cell, and a Physical Cell Identifier (PCI) dedicated to the NTN cell; notifying User Equipment (UE) of at least one of the following information: a frequency band indicator of the frequency band, the frequency, and the PCI.

15 Claims, 4 Drawing Sheets

---

Allocate, to an NTN cell, at least one of a frequency band dedicated to the NTN cell, a frequency dedicated to the NTN cell, and a PCI dedicated to the NTN cell — S102

Notify UE of at least one of the following information: a frequency band indicator of frequency band, the frequency, and the PCI — S104

(58) Field of Classification Search
CPC . H04W 48/20; H04W 84/06; H04W 36/0083; H04B 7/18543
See application file for complete search history.

(56) References Cited

FOREIGN PATENT DOCUMENTS

| CN | 108400810 A | 8/2018 | | |
|---|---|---|---|---|
| CN | 108811086 A | 11/2018 | | |
| EP | 2257106 A1 | * 12/2010 | ............ | H04W 36/36 |
| GB | 2576203 A | 2/2020 | | |
| WO | WO-2020032591 A1 | * 2/2020 | ............ | H04L 1/1812 |
| WO | WO-2020067756 A1 | * 4/2020 | ............ | H04B 17/327 |

OTHER PUBLICATIONS

European Search Report for corresponding application EP19894092; Report dated Apr. 11, 2022.
Ericsson, "Report of email discussion [103bis#34] [NR-NTN]", 3GPP TSG-RAN WG2 Meeting #103bis, Spokane, US, Nov. 12-16, 2018, R2-1817754.

* cited by examiner

INFORMATION PROCESSING AND RECEIVING METHOD AND DEVICE, AND STORAGE MEDIUM

CROSS REFERENCE

This application is a National Stage Filing of the PCT International Application No. PCT/CN2019/120944 filed on Nov. 26, 2019, which claims priority to Chinese Application No. 201811497080.0 filed on Dec. 7, 2018, the entirety of which is herein incorporated by reference.

TECHNICAL FIELD

Embodiments of the present disclosure relate to, but are not limited to, the field of communications.

BACKGROUND

Standard formulation of a 5G New radio (NR) has been substantially completed. There are extensive application scenarios of the 5G NR in the terrestrial network, such as enhanced Mobile BroadBand (eMBB), massive Machine-Type Communications (m-MTC), and critical Machine Type-Communication (c-MTC) etc. In a terrestrial communication network, all base stations are deployed on Earth, while in a non-terrestrial communication network, part or all of the functions of base stations will be deployed to satellites or airborne/vehicles.

Generally, satellites may include Low Earth Orbiting (LEO) satellites, Medium Earth Orbiting (MEO) satellites, Geostationary Earth Orbiting (GEO) satellites, and the like. The GEO satellites are self-rotating synchronized with Earth, so the GEO satellites are fixed in the air with respect to terrestrial users. However, the LEO satellites and the MEO satellites fly in the sky over Earth, so the LEO satellites and the MEO satellites move in the sky over time relative to terrestrial users. Here, the LEO satellites and the MEO satellites are collectively referred to as Non-GEO satellites (Non-Geostationary Orbiting satellites). Since the non-GEO satellites fly in the air along an orbit, for example, a satellite may fly over a 200 km ground coverage area in 10 minutes in certain deployment scenarios, which results in a serving cell change due to the movement of the non-GEO satellites even for user equipment (UE, also referred to as a user terminal) that is stationary on the ground.

In a traditional terrestrial communication network, a signal is transmitted on an air interface (between a user terminal and a base station) with a very small time delay, typically shorter than 1 ms. While in a non-terrestrial communication network, the satellite is located in the high space, for example, the height of a GEO satellite is 35786 km, the height of an LEO satellite is usually between 300-1500 km, and the height of an MEO satellite is usually between 7000-25000 km, so the delay of signal transmission between the terrestrial UE and the satellite is very large, for example, the maximum round trip transmission delay between a UE and a GEO satellite is up to 271.57 ms, the maximum round trip transmission delay between a UE and an LEO satellite with a height of 600 km is up to 12.88 ms, and the maximum round trip transmission delay between a UE and an LEO satellite with a height of 1200 km is up to 20.87 ms. Current related technologies for 5G NR have been developed based on deployment characteristics and transmission characteristics of traditional terrestrial communication networks, and do not take into account characteristics of non-terrestrial communication networks.

No effective solution has been proposed for the problem of how to guarantee the communication performance when 5G NR technologies are applied to a non-terrestrial communication network.

SUMMARY

Embodiments of the present disclosure provide an information processing and receiving method and device, and a storage medium, which may at least solve the problem of how to guarantee the communication performance when 5G NR technologies are applied to a non-terrestrial communication network.

According to an embodiment of the present disclosure, an information processing method is provided. The information processing method includes: allocating, to a Non-Terrestrial Network (NTN) cell, at least one of a frequency band dedicated to the NTN cell, a frequency dedicated to the NTN cell, and a Physical Cell Identifier (PCI) dedicated to the NTN cell; and notifying UE of at least one of the following information: a frequency band indicator of the frequency band, the frequency, and the PCI.

According to another embodiment of the present disclosure, an information receiving method is provided. The information receiving method includes: receiving System Frame Number (SFN) update auxiliary information; and receiving a Master Information Block (MIB) according to the SFN update auxiliary information.

According to another embodiment of the present disclosure, an information processing device is provided. The information processing device includes: an allocating module, configured to allocate, to an NTN cell, at least one of a frequency band dedicated to the NTN cell, a frequency dedicated to the NTN cell, and a PCI dedicated to the NTN cell; and a notifying module, configured to notify UE of at least one of the following information: a frequency band indicator of the frequency band, the frequency, and the PCI.

According to another embodiment of the present disclosure, an information receiving device is provided. The information receiving device includes: a first receiving module, configured to receive system frame number (SFN) update auxiliary information; and a second receiving module, configured to receive a Master Information Block (MIB) according to the SFN update auxiliary information.

According to another embodiment of the present disclosure, a storage medium is provided. The storage medium stores a computer program, wherein the computer program is configured to execute the information processing method at runtime.

According to another embodiment of the present disclosure, a storage medium is provided. The storage medium stores a computer program, wherein the computer program is configured to execute the information receiving method at runtime.

BRIEF DESCRIPTION OF THE DRAWINGS

Drawings, provided for further understanding of the present disclosure and forming a part of the specification, are used to explain the present disclosure together with exemplary embodiments of the present disclosure rather than to limit the present disclosure. The meaning of each drawing is as follows.

DETAILED DESCRIPTION

Hereinafter, embodiments of the present disclosure will be described in detail with reference to the accompanying drawings and embodiments. It is important to note that the embodiments of the present disclosure and the characteristics in the embodiments can be combined under the condition of no conflicts.

It should be noted that terms such as "first" and "second" in the description and claims of the embodiments of the present disclosure and the drawings are used to distinguish similar objects, and are not necessarily used to describe a specific sequence or order.

Figure 1:
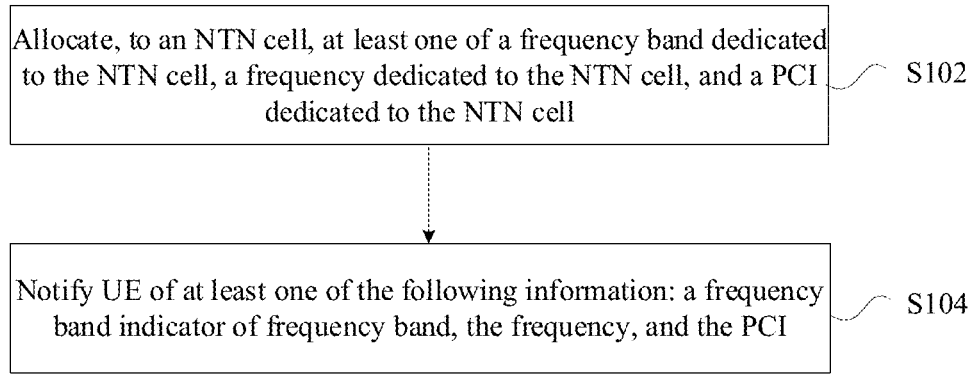
FIG. 1 is a flowchart of an information processing method according to an embodiment of the present disclosure.

An embodiment of the present disclosure provides an information processing method. FIG. 1 is a flowchart of an information processing method according to an embodiment of the present disclosure. As shown in FIG. 1, the information processing method in the embodiment of the present disclosure includes operations S102 and S104 which are described in detail below.

In operation S102, an NTN cell is allocated with at least one of a frequency band dedicated to the NTN cell, a frequency dedicated to the NTN cell and a PCI dedicated to the NTN cell.

In operation S104, at least one of the following information is notified to UE: a frequency band indicator of the frequency band, the frequency, and the PCI.

By means of the described operations, an NTN cell is allocated with at least one of a frequency band dedicated to the NTN cell, a frequency dedicated to the NTN cell and a PCI dedicated to the NTN cell; and at least one of the following information to UE: a frequency band indicator of the frequency band, the frequency, and the PCI. The technical solution solves the problem in the related art of how to guarantee the communication performance, such as performance in aspects of measurement, cell selection and cell reselection, when 5G NR technologies are applied to a non-terrestrial communication network.

It should be noted that, the entity for performing operations S102 and S104 may be a network-side device such as a base station, and is not limited in the embodiment of the present disclosure.

In an embodiment of the present disclosure, the frequency may be notified to the UE in the following manner: adding an NTN dedicated frequency list in a system message to notify the UE of the frequency dedicated to NTN, wherein the NTN dedicated frequency list includes an inter-frequency dedicated to the NTN cell.

In an embodiment of the present disclosure, the frequency may be notified to the UE in at least one of the following manners: adding a GEO dedicated frequency list in a system message to notify the UE of an inter-frequency dedicated to a GEO cell; and adding a Non-GEO dedicated frequency list in a system message to notify the UE of an inter-frequency dedicated to a Non-GEO cell, wherein the Non-GEO includes at least one of LEO and MEO.

In an embodiment of the present disclosure, the PCI may be notified to the UE in the following manner: adding an intra-frequency neighboring cell list of the NTN cell in a system message to notify the UE of the PCI of the NTN cell on a serving frequency.

In an embodiment of the present disclosure, the PCI may be notified to the UE in the following manner: adding an inter-frequency neighboring cell list of the NTN cell in a system message to notify the UE of the PCI of the NTN cell on an inter-frequency.

In an embodiment of the present disclosure, the PCI may be notified to the UE in at least one of the following manners: adding an intra-frequency neighboring cell list of a GEO cell in a system message to notify the UE of the PCI of the GEO cell on a serving frequency; and adding an intra-frequency neighboring cell list of a Non-GEO cell in a system message to notify the UE of the PCI of the Non-GEO cell on a serving frequency.

In an embodiment of the present disclosure, the PCI may be notified to the UE in at least one of the following manners: adding an inter-frequency neighboring cell list of a GEO cell in a system message to notify the UE of the PCI of the GEO cell on an inter-frequency; and adding an inter-frequency neighboring cell list of a Non-GEO cell in a system message to notify the UE of the PCI of the Non-GEO cells on an inter-frequency.

Through the description of the foregoing embodiments, a person having ordinary skill in the art may clearly understand that the method according to the foregoing embodiments may be implemented by software in addition to a universal hardware platform, and may alternatively be implemented by hardware. However, in many cases, the former is a preferred implementation. Based on such understanding, the substance of the technical solutions of the embodiments of the present disclosure or the part of the technical solutions of the embodiments of the present disclosure making contributions to the related art may be embodied in the form of a software product. The computer software product is stored in a storage medium (such as a ROM/RAM, a magnetic disk, and an optical disk), and includes multiple instructions for enabling a terminal device (which may be a mobile phone, a computer, a server, or a network device) to perform the method of each embodiment of the present disclosure.

The embodiment further provides an information processing device, which is configured to implement the described embodiment and exemplary implementation, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceivable.

Figure 2:
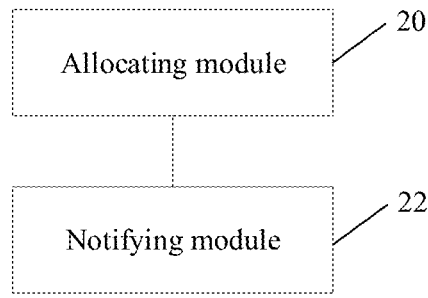
FIG. 2 is a structural block diagram of an information processing device according to an embodiment of the present disclosure.

FIG. 2 is a structural block diagram of an information processing device according to an embodiment of the present disclosure. As shown in FIG. 2, the device includes an allocating module 20 and a notifying module 22.

The allocating module 20 is configured to allocate, to an NTN cell, at least one of a frequency band dedicated to the NTN cell, a frequency dedicated to the NTN cell and a PCI dedicated to the NTN cell. The notifying module 22 is configured to notify the UE of at least one of the following information: a frequency band indicator of the frequency band, the frequency, and the PCI.

According to the embodiment of the present disclosure, an NTN cell is allocated with at least one of a frequency band dedicated to the NTN cell, a frequency dedicated to the NTN cell and a PCI dedicated to the NTN cell; and at least one of the following information to UE: a frequency band indicator of the frequency band, the frequency, and the PCI. The technical solution solves the problem in the related art of how to guarantee the communication performance, such as performance in aspects of measurement, cell selection and cell reselection, when 5G NR technologies are applied to a non-terrestrial communication network.

In an embodiment of the present disclosure, the notifying module 22 may be further configured to notify the UE of the frequency by adding an NTN dedicated frequency list in the system message to notify the UE of the frequency dedicated to NTN, wherein the NTN dedicated frequency list includes an inter-frequency dedicated to the NTN cell.

In an embodiment of the present disclosure, the notifying module 22 may be further configured to notify the UE of the frequency in at least one of the following manners: adding a GEO dedicated frequency list in a system message to notify the UE of an inter-frequency dedicated to a GEO cell; and adding a Non-GEO dedicated frequency list in a system message to notify the UE of an inter-frequency dedicated to a Non-GEO cell, wherein the Non-GEO includes at least one of LEO and MEO.

In an embodiment of the present disclosure, the notifying module 22 may be further configured to notify the UE of the PCI by adding an intra-frequency neighboring cell list of the NTN cell in a system message to notify the UE of the PCI of the NTN cell on a serving frequency.

In an embodiment of the present disclosure, the notifying module 22 may be further configured to notify the UE of the PCI by adding an inter-frequency neighboring cell list of the NTN cell in a system message to notify the UE of the PCI of the NTN cell on an inter-frequency.

In an embodiment of the present disclosure, the notifying module 22 may be further configured to notify the UE of the PCI by at least one of the following manners: adding an intra-frequency neighboring cell list of a GEO cell in a system message to notify the UE of the PCI of the GEO cell on a serving frequency; and adding an intra-frequency neighboring cell list of a Non-GEO cell in a system message to notify the UE of the PCI of the Non-GEO cell on a serving frequency.

In an embodiment of the present disclosure, the notifying module 22 may be further configured to notify the UE of the PCI by at least one of the following manners: adding an inter-frequency neighboring cell list of a GEO cell in a system message to notify the UE of the PCI of the GEO cell on an inter-frequency; and adding an inter-frequency neighboring cell list of a Non-GEO cell in a system message to notify the UE of the PCI of the Non-GEO cells on an inter-frequency.

Figure 3:
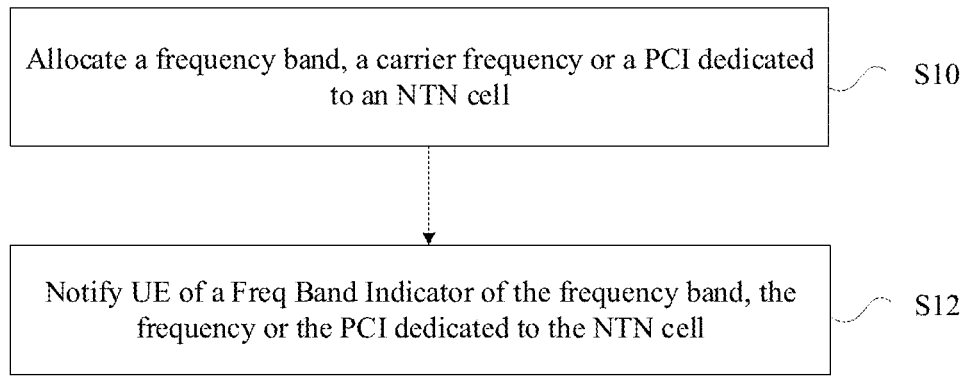
FIG. 3 is another flowchart of an information processing method according to an embodiment of the present disclosure.

The above technical solutions will be further described below in conjunction with a detailed example, which is however not intended to limit the technical solutions of the embodiments of the present disclosure. As shown in FIG. 3, the embodiment of the present disclosure includes operations S10 and S12 which are described in detail below.

In operation S10, a frequency band (abbreviated as band), a frequency (e.g., a carrier frequency) or a PCI dedicated to an NTN cell is allocated.

In operation S12, UE is notified of a frequency band indicator (abbreviated as Freq Band Indicator) of the frequency band, the frequency or the PCI dedicated to the NTN cell.

A first implementation of the embodiments of the present disclosure is as follows.

TABLE 1

NR Frequency Range 1 (FR1) band allocation.

| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1695 MHz-1710 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

TABLE 2

NR Frequency Range 2 (FR2) band allocation.

| NR operating band | Uplink (UL) and Downlink (DL) operating band BS transmit/receive UE transmit/receive $F_{UL\_low}$-$F_{UL\_high}$ $F_{DL\_low}$-$F_{DL\_high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

As shown in Table 1 and Table 2, the frequency band allocation in the frequency ranges of FR1 and FR2 are specified in NR. The numerical value in the first column of the tables is the frequency band indicator of the frequency band. When the NR is extended to be applied to the NTN network, dedicated frequency bands need to be allocated to the NTN cells in Table 1 and Table 2, and the allocation is shown in Table 3 and Table 4 as examples.

TABLE 3

NR Frequency Range 1 (FR1) band allocation.

| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
|---|---|---|---|
| n1 | 1920 MHz-1980 MHz | 2110 MHz-2170 MHz | FDD |
| ... | ... | ... | ... |
| ntn35 | 2xxx MHz-2xxx MHz | 2xxx MHz-2xxx MHz | TDD |

TABLE 4

NR Frequency Range 2 (FR2) band allocation.

| NR operating band | Uplink (UL) and Downlink (DL) operating band BS transmit/receive UE transmit/receive $F_{UL\_low}$-$F_{UL\_high}$ $F_{DL\_low}$-$F_{DL\_high}$ | Duplex Mode |
|---|---|---|
| n257 | 26500 MHz-29500 MHz | TDD |
| ... | ... | ... |
| ntn262 | 2xxxx MHz-2xxxx MHz | TDD |
| ntn263 | 3xxxx MHz-3xxxx MHz | TDD |

The frequency band indicator of the frequency band dedicated to the NTN cell is broadcast in the system message. In an NR system, parameters relevant to inter-frequency reselection are broadcast via an SIB4 (a fourth SIB message), and information such as a downlink frequency (ARFCN-Value) of each inter-frequency carrier frequency and a frequency band indicator of a frequency band to which the downlink frequency belongs is broadcast via the SIB4.

The UE receives the SIB4 and performs inter-frequency cell reselection according to the SIB4. For example, for a UE that does not support satellite communication, it is determined according to the SIB4 that a frequency band indicator of a certain inter-frequency is a frequency band dedicated to an NTN cell, and the UE ignores the inter-frequency carrier frequencies when performing inter-frequency cell measurement and reselection.

A second implementation of the embodiments of the present disclosure is as follows.

In the present embodiment, when the NR is extended to be applied to an NTN network, dedicated frequencies need to be allocated to the NTN cells, i.e. the NTN cells and the TN (terrestrial network) cells are respectively deployed on different frequencies, and the NTN cells and the TN cells are not deployed on the same frequency.

In an NR system, parameters relevant to inter-frequency reselection are broadcast via an SIB4, and information such as a downlink frequency (ARFCN-Value) of each inter-frequency carrier frequency and a frequency band indicator of a frequency band to which the downlink frequency belongs is broadcast via the SIB4. In this implementation, compared with the inter-frequency carrier frequency list, which only includes frequencies dedicated to the TN, in the existing SIB4, a frequency list dedicated to the NTN is added in the SIB4 to notify the UE of the inter-frequency carrier frequencies dedicated to NTN cells. For example, a specific format of the newly added content may be as follows.

```
SIB4 ::=    SEQUENCE {
    interFreqCarrierFreqList    ,
    lateNonCriticalExtension        OCTET STRING    OPTIONAL,
    ...
    [[
    interFreqCarrierFreqListNTN  InterFreqCarrierFreqList  OPTIONAL,
    ]]
};
```

The inter-frequency carrier frequency list (abbreviated as interFreqCarrierFreqList) included in the existing SIB4 only includes inter-frequency carrier frequencies dedicated to the TN, while the newly added inter-frequency carrier frequency list (abbreviated as interFreqCarrierFreqListNTN) includes inter-frequency carrier frequencies dedicated to the NTN.

The UE receives the SIB4 and performs inter-frequency cell reselection according to the SIB4. For example, for a UE that does not support satellite communication, the UE ignores inter-frequency carrier frequencies in the interFreqCarrierFreqListNTN when performing inter-frequency cell measurement and reselection.

A third implementation of the embodiments of the present disclosure is as follows.

In this implementation, when the NR is extended to be applied to the NTN network, dedicated frequencies are allocated to the GEO cells and the Non-GEOs respectively, that is, the GEO cells, the Non-GEO cells and the TN cells are respectively deployed on different frequencies.

In an NR system, parameters relevant to inter-frequency reselection are broadcast via an SIB4, and information such as a downlink frequency (ARFCN-Value) of each inter-frequency carrier frequency and a frequency band indicator of a frequency band to which the downlink frequency belongs is broadcast via the SIB4. In the present embodiment, compared with the inter-frequency carrier frequency list, which only includes frequencies dedicated to the TN, in the existing SIB4, a frequency list dedicated to the GEO and a frequency list dedicated to the Non-GEO are newly added in the SIB4 to respectively notify the UE of the inter-frequency carrier frequencies dedicated to GEO cells and the inter-frequency carrier frequencies dedicated to Non-GEO cells. For example, a specific format of the newly added content may be as follows.

```
SIB4 ::=    SEQUENCE {
    interFreqCarrierFreqList    ,
    lateNonCriticalExtension        OCTET STRING  OPTIONAL,
    ...
    [[
    interFreqCarrierFreqListGEO  InterFreqCarrierFreqList  OPTIONAL,
    interFreqCarrierFreqListNon-GEO  InterFreqCarrierFreqList  OPTIONAL,
    ]]
};
```

The inter-frequency carrier frequency list (abbreviated as interFreqCarrierFreqList) included in the existing SIB4 only includes inter-frequency carrier frequencies dedicated to the TN, while the newly added inter-frequency carrier frequency list (abbreviated as interFreqCarrierFreqListGEO and inter-FreqCarrierFreqListNon-GEO) include inter-frequency carrier frequencies dedicated to the GEO and inter-frequency carrier frequencies dedicated to the Non-GEO, respectively.

The UE receives the SIB4 and performs inter-frequency cell reselection according to the SIB4. For example, for a UE that does not support satellite communication, when performing inter-frequency cell measurement and reselection, the UE ignores inter-frequency carrier frequencies in interFreqCarrierFreqListNTN and interFreqCarrierFreqListNon-GEO. For example, for a UE supporting satellite communication, the UE in an IDLE state or an INACTIVE state preferentially selects to reside in a cell on a TN frequency or a cell on a GEO frequency, and this may be implemented and controlled by broadcasting frequency priority of each inter-frequency carrier frequency through a network. For another example, when the UE residing in the GEO cell initiates RRC (Radio Resource Control) connection establishment due to service demand, the UE reselects a Non-GEO cell of which the signal quality meets a reselection condition.

A fourth implementation of the embodiments of the present disclosure is as follows.

In this implementation, when the NR is extended to be applied to the NTN network, the NTN cells and the TN cells may be deployed on the same frequency, and some dedicated PCIs for deploying the NTN cells are specially allocated by the network.

In an NR system, intra-frequency neighboring cell information of a serving cell is broadcast via SIB3, the intra-frequency neighboring cell information including an intra-frequency neighboring cell list (abbreviated as intraFreqNeighCellList) and an intra-frequency neighboring black cell list (abbreviated as intraFreqBlackCellList). The intra-frequency neighboring cell list is configured with a cell reselection parameter dedicated to each of the intra-frequency neighboring cells in the list. The intra-frequency neighboring black cell list is configured with intra-frequency neighboring cell information which is not allowed to be reselected by a UE. In this implementation, an intra-frequency neighboring cell list for NTN cells (abbreviated as intraFreqNeighCellList-NTN) is broadcast in SIB3, wherein the intra-frequency neighboring cell list for the NTN cells includes the PCI of the NTN cells on a serving frequency.

In an NR system, parameters relevant to inter-frequency reselection are broadcast via an SIB4, and information such as downlink frequency (ARFCN-Value) of each inter-frequency carrier frequency, a frequency band indicator of the frequency band to which the downlink frequency belongs, an interFreqNeighCellList, and an interFreqBlackCellList is broadcast in the SIB4. In this implementation, an inter-frequency neighboring cell list for NTN cells (abbreviated as interFreqNeighCellList-NTN) is broadcast via the SIB4, wherein the interFreqNeighCellList-NTN includes the PCI of the NTN cells corresponding to the inter-frequency carrier frequencies.

The UE receives SIB3 (a third SIB message) and SIB4, and performs cell reselection according to the SIB3 and SIB4. For example, for UEs that do not support satellite communication, the UE ignores the NTN cells listed in interFreqNeighCellList-NTN on each carrier frequency when performing cell measurements and reselection.

A fifth implementation of the embodiments of the present disclosure is as follows.

In this implementation, when the NR is extended to be applied to the NTT network, the NTN cells and the TN cells may be deployed on the same frequency, some dedicated PCIs for deploying the GEO cells are specially allocated by the network, and some dedicated PCIs for deploying the Non-GEO cells are specially allocated.

In an NR system, intra-frequency neighboring cell information of a serving cell is broadcast via SIB3, the intra-frequency neighboring cell information including an intra-frequency neighboring cell list (abbreviated as intraFreqNeighCellList) and an intra-frequency neighboring black cell list (abbreviated as intraFreqBlackCellList). In this implementation, an intra-frequency neighboring cell list for GEO cells (abbreviated as intraFreqNeighCellList-GEO) is broadcast in SIB3, wherein the intra-frequency neighboring cell list for the GEO cells includes the PCI of the GEO cells on a serving frequency. An intra-frequency neighboring cell list for Non-GEO cells (abbreviated as intraFreqNeighCellList-non-GEO) is broadcast, wherein the intraFreqNeighCellList-non-GEO includes a PCI of a Non-GEO cell on the serving frequency.

In an NR system, parameters relevant to inter-frequency reselection are broadcast via an SIB4, and information such as downlink frequency (ARFCN-Value) of each inter-frequency carrier frequency, a frequency band indicator of a frequency band to which the downlink frequency belongs, an interFreqNeighCellList, and an interFreqBlackCellList is broadcast in the SIB4. In this implementation, an inter-frequency neighboring cell list for GEO cells (abbreviated as interFreqNeighCellList-GEO) is broadcast in the SIB4, wherein the interFreqNeighCellList-GEO includes a PCI of GEO cells on a corresponding inter-frequency carrier frequency. In SIB4, an inter-frequency neighboring cell list for Non-GEO cells (abbreviated as interFreqNeighCellList-non-GEO) is broadcast, wherein the interFreqNeighCellList-non-GEO includes a PCI of Non-GEO cells on a corresponding inter-frequency carrier frequency.

The UE receives SIB3 and SIB4 and performs cell reselection according to the SIB3 and SIB4. For example, for UEs that do not support satellite communication, the UE ignores the NTN cells listed in interFreqNeighCellList-GEO and interFreqNeighCellList-non-GEO on each frequency when performing cell measurements and reselection. For example, for a UE supporting satellite communication, the UE in an IDLE state or an INACTIVE state preferentially selects to reside in a TN cell or a GEO cell on one frequency. The UE preferentially selects to reside in a PDN cell or a GEO cell on one frequency, and this may be implemented and controlled by broadcasting dedicated cell reselection parameter control of the TN cell or the GEO cell through a network. For another example, when a UE residing in a GEO cell initiates RRC connection establishment due to service requirements, the UE reselects a Non-GEO cell of which signal quality satisfies a reselection condition.

Figure 4:
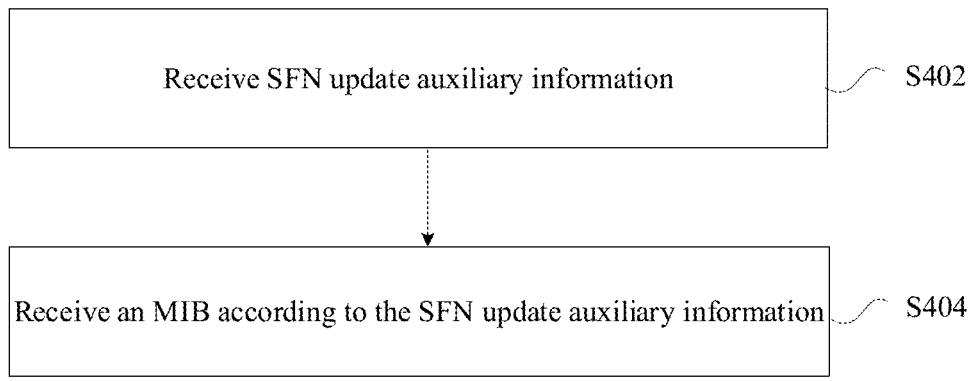
FIG. 4 is a flowchart of an information receiving method according to an embodiment of the present disclosure.

An information receiving method is provided in an embodiment. FIG. 4 is a flowchart of the information receiving method according to an embodiment of the present disclosure. As shown in FIG. 4, the method includes operations S402 and S404 which are described in detail as follows.

In operation S402, SFN update auxiliary information is received.

In operation S404, a Master Information Block (MIB) is received according to the SFN update auxiliary information.

By means of the embodiments of the present disclosure, UE receives SFN update auxiliary information, receives an MIB according to the SFN update auxiliary information, and further determines a manner in which the UE receives the MIB.

In the embodiments of the present disclosure, the SFN update auxiliary information includes at least one of the following information: information for instructing UE to update an SFN when changing a serving SSB (Synchronization Signal and PBCH Block, or Broadcast Signal Block); SSB group information; an elevation angle change threshold.

In an embodiment of the present disclosure, the method further includes the following operations. In a case where the SFN update auxiliary information includes information for instructing the UE to update the SFN when changing the serving SSB, and the UE changes from one SSB to another SSB, the UE re-reads the MIB from said other SSB, and obtains the SFN from the re-read MIB. In a case where the SFN update auxiliary information includes the SSB group information, and the UE changes from an SSB in one SSB group to an SSB in another SSB group, the UE re-reads the MIB from the SSB in said other SSB group, and uses the SFN acquired from the re-read MIB. In a case where the SFN update auxiliary information includes the elevation angle change threshold, and the UE detects that a change in an elevation angle between the UE and a satellite exceeds the elevation angle change threshold, the UE re-reads the MIB and uses the SFN acquired from the re-read MIB.

Through the description of the foregoing embodiments, a person having ordinary skill in the art may clearly understand that the method according to the foregoing embodiments may be implemented by software in addition to a universal hardware platform, and may alternatively be implemented by hardware. However, in many cases, the former is a preferred implementation. Based on such understanding, the substance of the technical solutions of the embodiments of the present disclosure or the part of the technical solutions of the embodiments of the present disclosure making contributions to the related art may be embodied in the form of a software product. The computer software product is stored in a storage medium (such as a ROM/RAM, a magnetic disk, and an optical disk), and includes multiple instructions for enabling a terminal device (which may be a mobile phone, a computer, a server, or a network device) to execute the method of each embodiment of the present disclosure.

The embodiment further provides an information receiving device, which is configured to implement the described embodiment and exemplary implementation, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceivable.

Figure 5:
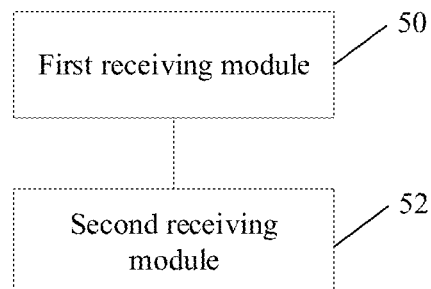
FIG. 5 is a structural block diagram of an information receiving device according to an embodiment of the present disclosure.

FIG. 5 is a structural block diagram of an information receiving device according to an embodiment of the present disclosure. As shown in FIG. 5, the device includes a first receiving module 50 and a second receiving module 52.

The first receiving module 50 is configured to receive SFN update auxiliary information.

The second receiving module 52 is configured to receive an MIB according to the SFN update auxiliary information.

By means of the embodiments of the present disclosure, UE receives SFN update auxiliary information, receives a main information block MIB according to the SFN update auxiliary information, and further determines a manner in which the UE receives the MIB.

In the embodiments of the present disclosure, the SFN update auxiliary information includes at least one of the following information: information for instructing UE to update an SFN when changing a serving SSB; SSB group information; an elevation angle change threshold.

In an embodiment of the present disclosure, the device is further configured to perform the following operations. In a case where the SFN update auxiliary information includes information for instructing the UE to update the SFN when changing the serving SSB, and the UE changes from one SSB to another SSB, the UE re-reads the MIB from said other SSB, and obtains the SFN from the re-read MIB. In a case where the SFN update auxiliary information includes the SSB group information, and the UE changes from an SSB in one SSB group to an SSB in another SSB group, the UE re-reads the MIB from the SSB in said other SSB group, and uses the SFN acquired from the re-read MIB. In a case where the SFN update auxiliary information includes the elevation angle change threshold, and the UE detects that a change in an elevation angle between the UE and a satellite exceeds the elevation angle change threshold, the UE re-reads the MIB and uses the SFN acquired from the re-read MIB.

Figure 6:
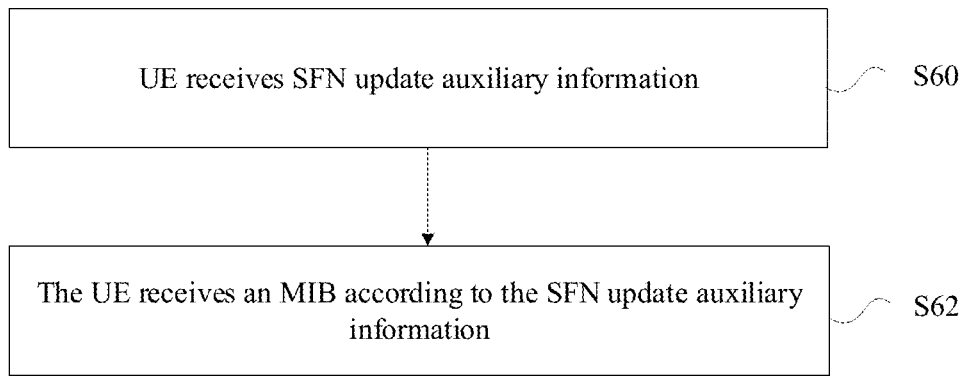
FIG. 6 is another flowchart of an information receiving method according to an embodiment of the present disclosure.

The information receiving process will be described below with reference to an example, which is not intended to limit the technical solution of the embodiments of the present disclosure. As shown in FIG. 6, the information receiving process includes operations S60 and S62 which are described in detail below.

In operation S60, UE receives SFN update auxiliary information.

In operation S62, the UE receives an MIB according to the SFN update auxiliary information.

A first implementation of the embodiments of the present disclosure is as follows.

Figure 7:
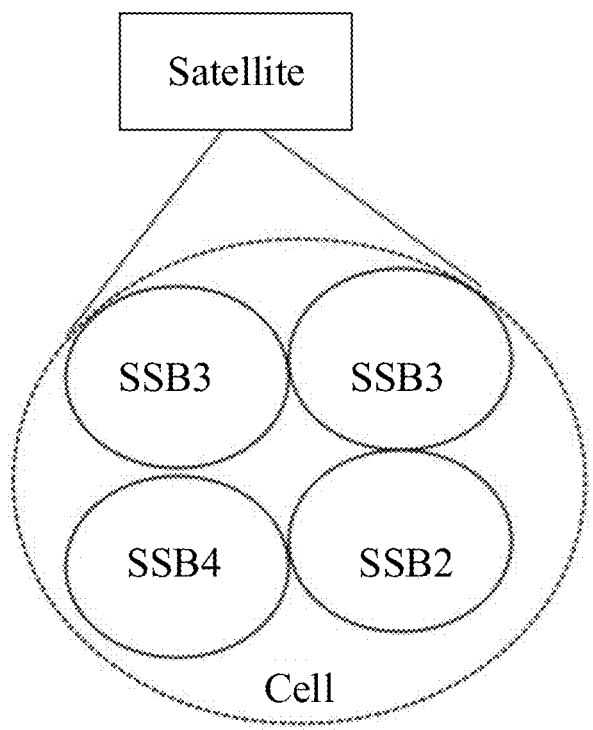
FIG. 7 is a schematic diagram of satellite coverage according to an embodiment of the present disclosure.

The cell as shown in FIG. 7 is a cell covered by a satellite, and the cell contains a plurality of (four) satellite beams, wherein each satellite beam respectively sends a Synchronization Signal and PBCH Block (SSB), and the SSBn in FIG. 7 represents broadcast signal blocks of different satellite beams. In the present embodiment, a serving cell broadcasts SFN update auxiliary information in a system message (such as SIB1), or sends the SFN update auxiliary information in RRC dedicated signalling, the SFN update auxiliary information being information for instructing a UE to update an SFN when changing a serving SSB, and the information being used for notifying the UE that the UE needs to re-read an MIB from a new SSB when the UE changes the serving SSB from one SSB to another SSB.

The UE receives the SFN update auxiliary information; and when the UE changes from one SSB to another SSB, the UE re-reads an MIB from said other SSB, and uses an SFN acquired from the MIB.

In an NTN network, different satellite beams sent from the same satellite may arrive at the ground through different transmission paths, for example, some satellite beams arrive at the ground through a direct path, and some satellite beams arrive at the ground through a reflection path. Because satellites are located at high altitude and are far away from a ground UE, different transmission paths may very likely cause a great difference in the time that the signals sent from different satellite beams arrive at the ground. Therefore, after a UE changes from one satellite beam to another satellite beam, an SFN locally maintained by the UE is inconsistent with an SFN broadcast in the MIB of another beam. The technical problem can be solved by adopting the method of the present embodiment.

A second implementation of the embodiments of the present disclosure is as follows.

Figure 8:
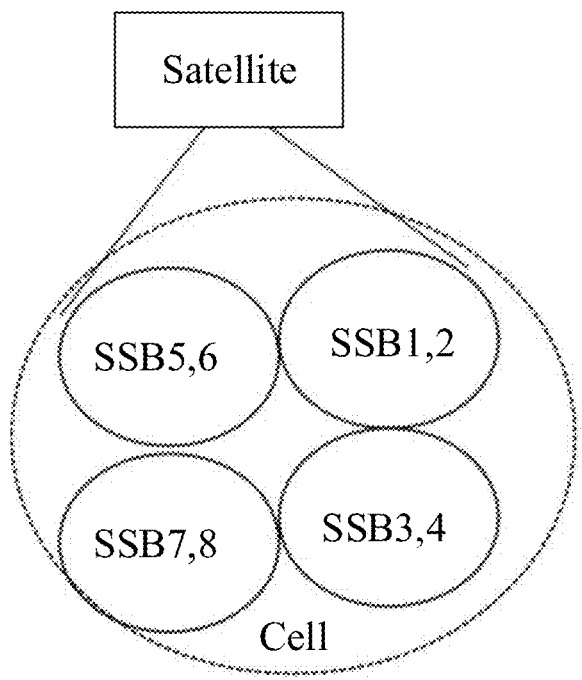
FIG. 8 is another schematic diagram of satellite coverage according to an embodiment of the disclosure.

The cell as shown in FIG. 8 is a cell covered by a satellite, and the cell contains a plurality of (four) satellite beams, wherein each satellite beam respectively sends two SSBs, and the SSBn in FIG. 8 represents different broadcast signal blocks of different satellite beams. In the present embodiment, a serving cell broadcasts SFN update auxiliary information in a system message, or sends the SFN update auxiliary information in RRC dedicated signalling, wherein the SFN update auxiliary information is SSB group information, and the SSB group information is used for notifying a UE that the UE needs to re-read an MIB from a new SSB when the UE changes from an SSB in one SSB group to an SSB in another SSB group. Each SSB group includes at least one SSB.

The following exemplifies the SSB group information.

Example 1

A serving cell broadcasts SFN update auxiliary information in a system message, or sends the SFN update auxiliary information in RRC dedicated signalling, wherein the SFN update auxiliary information contains SSB group information. The SSB group information is as follows.

Group 1: {SSB1, SSB2}.
Group 2: {SSB3, SSB4}.
Group 3: {SSB5, SSB6}.
Group 4: {SSB7, SSB8}.

A UE receives the SFN update auxiliary information. When the UE changes from an SSB in one SSB group to an SSB in another SSB group, the UE re-reads an MIB from the SSB in said other SSB group, and uses the SFN acquired from the MIB. For example, when the UE changes from SSB1 of Group 1 to SSB4 of Group 2, the UE re-reads the MIB from SSB4 and uses the SFN acquired in the MIB.

Example 2

A serving cell broadcasts SFN update auxiliary information in a system message, or sends the SFN update auxiliary information in RRC dedicated signalling, wherein the SFN update auxiliary information contains SSB group information. The SSB group information is as follows.

Group 1: {SSB1~SSB4}.
Group 2: {SSB4~SSB8}.

A UE receives SFN update auxiliary information. When the UE changes from an SSB in one SSB group to an SSB in another SSB group, the UE re-reads an MIB from the SSB in said other SSB group, and uses the SFN acquired from the MIB. For example, when the UE changes from SSB1 of Group 1 to SSB4 of Group 2, the UE re-reads the MIB from SSB4 and uses the SFN acquired in the MIB.

By adopting the method of the present embodiment, the problem in an NTN system that an SFN locally maintained by a UE is inconsistent with an SFN broadcasted in MIB of another beam after the UE is switched from one satellite beam to another satellite beam can be solved.

A third implementation of the embodiments of the present disclosure is as follows.

Figure 9:
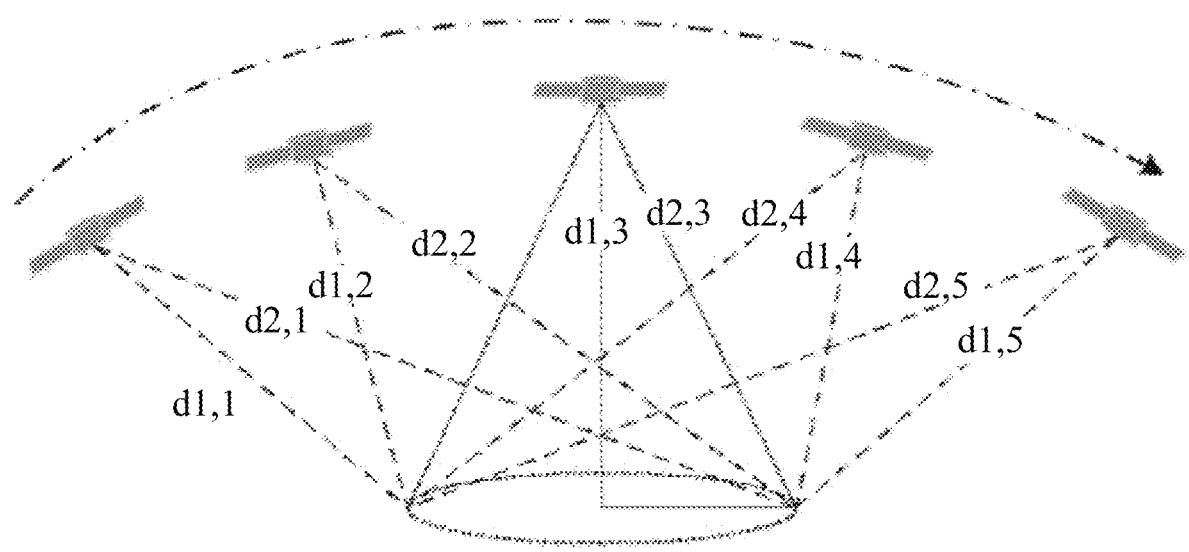
FIG. 9 is a schematic diagram of a satellite staring beam according to an embodiment of the present disclosure.

FIG. 9 is a schematic diagram of a satellite staring beam (e.g., a steerable beam or earth fixed beam). The satellite beams are fixed to cover a specific region of the ground in a period of time by a satellite beamforming technique. The elevation angle between the satellite and the ground changes over time as the satellite moves during the time that the staring beams cover a particular region of the ground. In FIG. 9, a plurality of gray objects represents satellites at different positions, and lines with "d" represent boundary lines of areas covered by satellite beams when the satellites are at different positions.

In the present embodiment, a serving cell broadcasts SFN update auxiliary information in a system message, or sends the SFN update auxiliary information in RRC dedicated signalling, the SFN update auxiliary information being an elevation angle change threshold. The elevation angle change threshold value is used for notifying a UE to re-read an MIB when an elevation angle change between the UE and a satellite exceeds the elevation angle change threshold value.

A UE receives SFN update auxiliary information. The UE detects an elevation angle between the UE and a satellite. When it is detected that an elevation angle change between the UE and the satellite exceeds the elevation angle change threshold value, the UE re-reads an MIB, and uses an SFN acquired from the MIB.

When the satellite adopts the staring beams to cover a ground area, as the satellite moves, the transmission distance between the satellite and the ground UE changes, and different transmission distances may result in a large difference in the transmission delay of signals sent from the same satellite beams to the ground at different times, thereby causing the SFNs maintained locally by the UE to be different from SFNs received from the MIB. With the method of the present embodiment, the UE detects the elevation angle between the UE and the satellite, and when it is detected that the change of the elevation angle between the UE and the satellite exceeds the elevation angle change threshold notified by the network, the UE re-reads the MIB, and uses the SFN acquired in the MIB, which can solve the technical problem.

Embodiments of the present disclosure provide a storage medium. The storage medium stores a program. The program is configured to execute the method according to any one of the described embodiments at runtime.

In this embodiment, the storage medium may be configured to store a program code for executing operations S1 and S2 below.

In operation S1, an NTN cell is allocated with at least one of a frequency band dedicated to the NTN cell, a frequency dedicated to the NTN cell and a PCI dedicated to the NTN cell.

In operation S2, at least one of the following information is notified to UE: a frequency band indicator of the frequency band, the frequency, and the PCI.

In this embodiment, the storage medium may be configured to store a program code for executing the following operations S3 and S4.

In operation S3, SFN update auxiliary information is received.

In operation S4, an MIB is received according to the SFN update auxiliary information.

In this embodiment, the storage medium may include, but is not limited to, any medium that can store program codes, such as a USB flash disk, a Read-Only Memory (ROM for short), a Random Access Memory (RAM for short), a removable hard disk, a magnetic disk, or an optical disk.

Alternatively, for specific examples in this embodiment, reference may be made to the examples described in the foregoing embodiments and exemplary implementations, and details are not repeatedly described herein in this embodiment.

Obviously, those skilled in the art should understand that the modules or operations of the above embodiments of the present disclosure can be implemented by a common computing device, and they can be concentrated on a single computing device or distributed on a network composed of a plurality of computing devices. Optionally, they may be implemented by program codes executable by a computing device, so that they may be stored in a storage device and executed by the computing device, and in some cases, the illustrated or described operations may be executed in an order different from that here. Alternatively, they are manufactured into integrated circuit modules respectively, or a plurality of modules or operations are manufactured into a single integrated circuit module for implementation. As such, embodiments of the present disclosure are not limited to any particular hardware and software combination.

The above descriptions are only exemplary embodiments of the present disclosure, and are not intended to limit the present disclosure. For those skilled in the art, the embodiments of the present disclosure may have various modifications, equivalent replacements, improvements and the like made within the principle of the embodiments of the present disclosure shall belong to the scope of protection of the present disclosure.

What is claimed is:

1. An information processing method that extends application of New Radio (NR) to a Non-Terrestrial Network (NTN), wherein the information processing method is performed by a network-side device of the NTN, and comprises:
    allocating, to a n NTN cell, at least one of a frequency band dedicated to the NTN cell, a frequency dedicated to the NTN cell, and a Physical Cell Identifier (PCI) dedicated to the NTN cell, wherein the frequency band dedicated to the NTN cell, the frequency dedicated to the NTN cell, or the PCI dedicated to the NTN cell is different from a frequency band, a frequency, or a PCI allocated to a Terrestrial Network (TN) cell; and
    notifying User Equipment (UE) of at least one of the following information: a frequency band indicator of the frequency band, the frequency, and the PCI.

2. The information processing method according to claim 1, wherein the frequency is notified to the UE by:
    adding an NTN dedicated frequency list in a system message to notify the UE of the frequency, wherein the NTN dedicated frequency list comprises an inter-frequency dedicated to the NTN cell.

3. The information processing method according to claim 1, wherein the frequency is notified to the UE by at least one of:
    adding a Geostationary Earth Orbiting (GEO) dedicated frequency list in a system message to notify the UE of an inter-frequency dedicated to a GEO cell; and
    adding a Non-GEO dedicated frequency list in a system message to notify the UE of an inter-frequency dedicated to a Non-GEO cell, wherein the Non-GEO comprises at least one of Low Earth Orbiting (LEO) and Medium Earth Orbiting (MEO).

4. The information processing method according to claim 1, wherein the PCI is notified to the UE by:
    adding an intra-frequency neighboring cell list of the NTN cell in a system message to notify the UE of the PCI of the NTN cell on a serving frequency.

5. The information processing method according to claim 1, wherein the PCI is notified to the UE by:
    adding an inter-frequency neighboring cell list of the NTN cell in a system message to notify the UE of the PCI of the NTN cell on an inter-frequency.

6. The information processing method according to claim 1, wherein the PCI is notified to the UE by at least one of:
    adding an intra-frequency neighboring cell list of a GEO cell in a system message to notify the UE of the PCI of the GEO cell on a serving frequency; and
    adding an intra-frequency neighboring cell list of a Non-GEO cell in a system message to notify the UE of the PCI of the Non-GEO cell on a serving frequency.

7. The information processing method according to claim 1, wherein the PCI is notified to the UE by at least one of:
    adding an inter-frequency neighboring cell list of a GEO cell in a system message to notify the UE of the PCI of the GEO cell on an inter-frequency; and
    adding an inter-frequency neighboring cell list of a Non-GEO cell in a system message to notify the UE of the PCI of the Non-GEO cell on an inter-frequency.

8. A network-side device that extends application of New Radio (NR) to a Non-Terrestrial Network (NTN), wherein the network-side device of the NTN comprises a memory storing instructions and a processor in communication with the memory, wherein the processor is configured to execute the instructions to:
    allocate, to n NTN cell, at least one of the following information: a frequency band dedicated to the NTN cell, a frequency dedicated to the NTN cell, and a Physical Cell Identifier (PCI) dedicated to the NTN cell, wherein the frequency band dedicated to the NTN cell, the frequency dedicated to the NTN cell, or the PCI dedicated to the NTN cell is different from a frequency band, a frequency, or a PCI allocated to a Terrestrial Network (TN) cell; and
    notify User Equipment (UE) of at least one of the following information: a frequency band indicator of the frequency band, the frequency, and the PCI.

9. The network-side device according to claim 8, wherein the processor is configured to execute the instructions to notify the UE of the frequency by:
    adding an NTN dedicated frequency list in a system message to notify the UE of the frequency, wherein the NTN dedicated frequency list comprises an inter-frequency dedicated to the NTN cell.

10. The network-side device according to claim 8, wherein the processor is configured to execute the instructions to notify the UE of the frequency by at least one of:
    adding a Geostationary Earth Orbiting (GEO) dedicated frequency list in a system message to notify the UE of an inter-frequency dedicated to a GEO cell; and
    adding a Non-GEO dedicated frequency list in a system message to notify the UE of an inter-frequency dedicated to a Non-GEO cell, wherein the Non-GEO comprises at least one of Low Earth Orbiting (LEO) and Medium Earth Orbiting (MEO).

11. The network-side device according to claim 8, wherein the processor is configured to execute the instructions to notify the UE of the PCI by:
    adding an intra-frequency neighboring cell list of the NTN cell in a system message to notify the UE of the PCI of the NTN cell on a serving frequency.

12. The network-side device according to claim 8, wherein the processor is configured to execute the instructions to notify the UE of the PCI by:

adding an inter-frequency neighboring cell list of the NTN cell in a system message to notify the UE of the PCI of the NTN cell on an inter-frequency.

13. The network-side device according to claim 8, wherein the processor is configured to execute the instructions to notify the UE of the PCI by at least one of:
   adding an intra-frequency neighboring cell list of a GEO cell in a system message to notify the UE of the PCI of the GEO cell on a serving frequency; and
   adding an intra-frequency neighboring cell list of a Non-GEO cell in a system message to notify the UE of the PCI of the Non-GEO cell on a serving frequency.

14. The network-side device according to claim 8, wherein the processor is configured to execute the instructions to notify the UE of the PCI by at least one of:
   adding an inter-frequency neighboring cell list of a GEO cell in a system message to notify the UE of the PCI of the GEO cell on an inter-frequency; and
   adding an inter-frequency neighboring cell list of a Non-GEO cell in a system message to notify the UE of the PCI of the Non-GEO cell on an inter-frequency.

15. A non-transitory computer readable storage medium, wherein the storage medium stores a computer program, and the computer program, when being processed by a processor in a network-side device of a Non-Terrestrial Network (NTN), is configured to cause the processor to execute the following operations to extend application of New Radio (NR) to the NTN at runtime;
   allocating, to an NTN cell, at least one of a frequency band dedicated to the NTN cell, a frequency dedicated to the NTN cell, and a Physical Cell Identifier (PCI) dedicated to the NTN cell, wherein the frequency band dedicated to the NTN cell, the frequency dedicated to the NTN cell, or the PCI dedicated to the NTN cell is different from a frequency band, a frequency, or a PCI allocated to a Terrestrial Network (TN) cell; and
   notifying User Equipment (UE) of at least one of the following information: a frequency band indicator of the frequency band, the frequency, and the PCI.

* * * * *